United States Patent Office 3,458,512
Patented July 29, 1969

3,458,512
1 - ALKENYL - 3 - ALKYL - 7 - AMINO-1,2,3,4,5,6 - HEXAHYDRO - 2,4 - PTERI-DINEDIONES AND 1,2,3,4-TETRAHYDRO COMPOUNDS CORRESPONDING
Elmer F. Schroeder, Chicago, Ill., assignor to G. D. Searle & Co., Chicago, Ill., a corporation of Delaware
No Drawing. Continuation-in-part of application Ser. No. 553,028, May 26, 1966. This application Feb. 3, 1967, Ser. No. 613,751
Int. Cl. C07d 57/28; A61k 27/00
U.S. Cl. 260—251.5         14 Claims

ABSTRACT OF THE DISCLOSURE

1 - alkenyl - 3 - alkyl - 7 - amino - 1,2,3,4,5,6 - hexahydro - 2,4 - pteridinediones and 1,2,3,4 - tetrahydro compounds corresponding possessing pharmacological properties, in particular pepsin-inhibitory, anti-ulcerogenic, diuretic, anti-inflammatory, and preparable by the alkali-catalyzed cyclization of 1 - alkenyl - 3 - alkyl - 5 - (1 - cyanoalkylamino)/(1 - cyanoaralkylamino) - 6 - amino - 1,2,3,4 - tetrahydro - 2,4 - pyrimidinediones followed by oxidation of the resulting 1,2,3,4,5,6 - hexahydro - 2,4 - pteridinediones.

---

This application is a continuation-in-part of my copending application Ser. No. 553,028, filed May 26, 1966, now U.S. Patent No. 3,395,149.

The present invention relates to novel chemical compounds containing the pteridine bicyclic ring structure and characterized by a 7-amino substituent. These derivatives are represented by the following structural formula

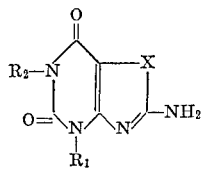

wherein $R_1$ is a lower alkenyl radical, $R_2$ is a lower alkyl radical and X is a radical completing the pyrazine ring structure and selected from the group consisting of $$-\underset{\underset{R_3}{|}}{C}H-NH$$

$$-\underset{\underset{R_3}{|}}{C}=N$$

radicals, $R_3$ being hydrogen or a radical of the formula (lower alkylene)—Z wherein Z is hydrogen or phenyl.

Examples of the lower alkyl radicals contemplated by the $R_2$ term are methyl, ethyl, propyl, butyl, pentyl, hexyl, heptyl and the branched-chain isomers thereof. The lower alkenyl radicals denoted by $R_1$ in that structural representation are typified by vinyl, allyl, methallyl, propenyl, butenyl, pentenyl, hexenyl and the branched-chain groups corresponding. Typical of the lower alkylene radicals embraced by that formula are methylene, ethylene, trimethylene, tetramethylene, pentamethylene and the branched-chain groups isomeric therewith.

The hexahydro compounds of the present invention are conveniently manufactured by cyclization of the corresponding 1 - alkenyl-3-alkyl-(1-cyanoalkylamino)/(1-cyanoaralkylamino) - 6 - amino - 1,2,3,4 - tetrahydro - 2,4 - pyrimidinediones of the following structural formula

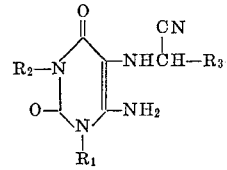

wherein $R_1$, $R_2$ and $R_3$ have the identical meanings hereinbefore indicated. Those intermediates and methods for their manufacture are disclosed in my copending application Ser. No. 553,028, filed May 26, 1966. The cyclization is alkali-catalyzed and is illustrated by the reaction of 1 - allyl - 3 - ethyl - 5 - cyanomethylamino - 6 - amino-1,2,3,4 - tetrahydro - 2,4 - pyrimidinedione with sodium methoxide in methanol at room temperature to afford 1-allyl - 3 - ethyl - 7 - amino - 1,2,3,4,5,6 - hexahydro-2,4-pteridinedione.

The instant tetrahydro compounds are produced upon oxidation of the aforementioned hexahydro substances. Oxidizing media such as aqueous hydrogen peroxide together with ferrous chloride are preferred. As a specific example, the methanolic solution containing the unisolated aforementioned 1-allyl-3-ethyl-7-amino-1,2,3,4,5,6-hexahydro - 2,4 - pteridinedione is contacted with ferrous chloride and aqueous hydrogen peroxide to produce 1-allyl - 3 - ethyl - 7 - amino - 1,2,3,4 - tetrahydro - 2,4 - pteridinedione.

The compounds of this invention exhibit valuable pharmacological properties. They are, for example, diuretic, anti-inflammatory and pepsin-inhibitory agents. In addition, they possess, anti-ulcerogenic properties.

Equivalent to the instant amines for the purposes of this invention are the corresponding nontoxic acid and quaternary salts exemplified by the citrate, tartrate, maleate, ascorbate, gluconate, lactate, succinate, phosphate, sulfate, hydrobromide, hydrochloride, methiodide, ethiodide, methochloride, methobromide, methosulfate, ethosulfate, etc.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples, temperatures are given in degrees centigrade (° C.) and quantities of materials in parts by weight except where otherwise noted.

EXAMPLE 1

To a mixture of 4.2 parts of 1-allyl-3-ethyl-5,6-diamino-1,2,3,4-tetrahydro-2,4-pyrimidinedione, 8 parts of methanol and 2.1 parts of glacial acetic acid is added, at 0–5°, a solution of 1.08 parts of sodium cyanide in 5 parts of water. That reaction mixture is warmed to about 40°, and 1.7 parts of 37% aqueous formaldehyde is added. The resulting homogeneous mixture is kept at 40–45° for about 45 minutes, then is diluted with water and cooled. The crystals which separate are collected by filtration, washed on the filter with water and dried to afford the crude product. Purification of that material by recrystallization from ethyl acetate yields pure 1-allyl-3-ethyl-5-cyanomethylamino - 6-amino-1,2,3,4-tetrahydro-2,4-pyrimidinedione as colorless needle-like crystals, melting at about 151–153°.

EXAMPLE 2

When an equivalent quantity of 1-methallyl-3-methyl-5,6-diamino-1,2,3,4-tetrahydro-2,4-pyrimidinedione is substituted in the procedure of Example 1, there is produced 1 - methallyl - 3-methyl-5-cyanomethylamino-6-amino-1,2,3,4-tetrahydro-2,4,-pyrimidinedione.

EXAMPLE 3

To a mixture of 4.2 parts of 1-allyl-3-ethyl-5,6-diamino-1,2,3,4-tetrahydro-2,4-pyrimidinedione, 8 parts of methanol and 3.15 parts of glacial acetic acid is added, at 0–5° over a period of about 2 minutes, a solution of 2 parts of sodium cyanide in 8 parts of water. That mixture is allowed to warm to about 25°, following which time a solution of 1.22 parts of propionaldehyde in 2.4 parts of methanol containing 3 parts of water is added. Stirring at about 25° is continued for approximately 15 minutes; then 5 parts of water is added and the mixture is heated at approximately 40° for about 30 minutes. The majority of the organic solvent is then removed by distillation, and the residual mixture is diluted with water. A solid forms rapidly and is collected by filtration, washed on the filter with water and dried to yield the crude product. Recrystallization of that material from aqueous ethanol yields pure 1-allyl-3-ethyl-5-(1-cyanopropylamino)-6-amino-1,2,3,4-tetrahydro-2,4-pyrimidinedione, melting at about 111–113°.

EXAMPLE 4

To a mixture containing 8.4 parts of 1-allyl-3-ethyl-5,6-diamino-1,2,3,4-tetrahydro-2,4-pyrimidinedione, 16 parts of methanol and 6.3 parts of glacial acetic acid is added gradually, at 0–5° with stirring, a solution of 4 parts of sodium cyanide in 16 parts of water. The ice bath is removed, and the mixture is allowed to warm to approximately 25°, at which time a solution of 3.04 parts of butyraldehyde in 4.8 parts of methanol containing 5 parts of water is added. The resulting reaction mixture becomes homogeneous, but after a few minutes the crystalline product begins to separate. The mixture is kept at room temperature for approximately 30 minutes longer, then is diluted with water and cooled to 0–5° by means of an ice bath. The crystalline product is then isolated by filtration, washed on the filter with water and dried. Recrystallization of that crude product from ethyl acetate-hexane yields pure 1 - allyl - 3 - ethyl-5-(1-cyanobutylamino)-6-amino-1,2,3,4,-tetrahydro-2,4,-pyrimidinedione as a colorless solid, melting at about 90–92°.

EXAMPLE 5

A mixture containing 16.8 parts of 1-allyl-3-ethyl-5,6-diamino-1,2,3,4-tetrahydro-2,4-pyrimidinedione, 41.6 parts of methanol and 12.6 parts of glacial acetic acid is cooled to 0–5°, then is stirred while a solution of 8 parts of sodium cyanide in 20 parts of water is added. The temperature is allowed to rise to approximately 25°, at which time a solution of 10 parts of phenylacetaldehyde in 12 parts of ethanol is added. The resulting homogeneous mixture is stirred at room temperature for about 30 minutes, then is diluted with approximately 80 parts of water. The initially oily product solidifies upon standing and is collected by filtration, washed on the filter with water and dried. That crude product is purified by recrystallization from ethyl acetate-hexane to yield pure 1-allyl-3-ethyl-5-(1 - cyanophenethylamino) - 6 - amino-1,2,3,4-tetrahydro-2,4-pyrimidinedione, melting at about 124–126°.

EXAMPLE 6

When equivalent quantities of 1-methallyl-3-methyl-5,6-diamino - 1,2,3,4 - tetrahydro-2,4-pyrimidinedione and 3-phenylpropionaldehyde are substituted in the procedure of Example 5, there is obtained 1-methallyl-3-methyl-5-(1-cyano - 3-phenylpropylamino)-6-amino-1,2,3,4-tetrahydro-2,4-pyrimidinedione.

EXAMPLE 7

A mixture containing 16.8 parts of 1-methallyl-3-methyl-5,6-diamino-1,2,3,4-tetrahydro-2,4-pyrimidinedione, 32 parts of methanol and 12.6 parts of glacial acetic acid is cooled to 0–5°, at which point a solution of 8 parts of sodium cyanide in 32 parts of water is added rapidly. That reaction mixture is allowed to warm to room temperature, and a solution of 4.88 parts of propionaldehyde in 9.6 parts of methanol containing 12 parts of water is added. Stirring at that temperature is continued for about 30 minutes, following which period of time the mixture is diluted with approximately 20 parts of water. After stirring for approximately 2 hours longer, the mixture is further diluted with water, then cooled to 0–5°. The crude solid product which separates is collected by filtration, washed on the filter with water and dried. Purification of that material by recrystallization from ethyl acetate-hexane results in 1-methallyl-3-methyl-5-(1-cyanopropylamino) - 6-amino - 1,2,3,4-tetrahydro-2,4-pyrimidinedione as pale yellow crystals, melting at about 124–127°.

EXAMPLE 8

To a mixture containing 16.8 parts of 1-methallyl-3-methyl - 5,6 - diamino-1,2,3,4-tetrahydro-2,4-pyrimidinedione, 32 parts of methanol and 12.6 parts of glacial acetic acid is added, at 0–5°, a solution of 8 parts of sodium cyanide in 32 parts of water. After warming to room temperature, a solution of 6.08 parts of butyraldehyde in 9.6 parts of methanol containing 10 parts of water is added. The resulting homogeneous reaction mixture is stirred at that temperature for about 30 minutes, then is diluted with water. The oily product which separates is stirred rapidly in order to promote crystallization. Additional product is precipitated by dilution with water followed by cooling to 0–5°. The resulting solid product is collected by filtration, washed on the filter with water and dried. Purification of that material by recrystallization from ethyl acetate-hexane yields pale yellow crystals of 1-methallyl - 3 - methyl-5-(1-cyanobutylamino)-6-amino-1,2,3,4-tetrahydro-2,4-pyrimidinedione, melting at about 109–111°.

EXAMPLE 9

A mixture containing 2.5 parts of 1-allyl-3-ethyl-5-cyanomethylamino-6-amino-1,2,3,4-tetrahydro - 2,4 - pyrimidinedione, 0.27 part of sodium methoxide and 32 parts of methanol is stirred at room temperature in an atmosphere of nitrogen for about 30 minutes, during which time complete solution occurs. Upon standing for about 10 minutes longer a bright yellow precipitate rapidly forms. The mixture is allowed to stand at room temperature for several hours longer, and yellow precipitate is then collected by filtration, washed on the filter with cold methanol and dried at approximately 75° to afford crystalline 1-allyl-3-ethyl-7-amino-1,2,3,4,5,6-hexahydro - 2,4-pteridinedione, melting at about 232–234° and characterized further by the following structural formula

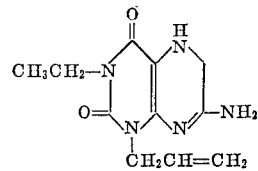

EXAMPLE 10

A mixture containing 5.55 parts of 1-allyl-3-ethyl-5-(1-cyanopropylamino)-6-amino-1,2,3,4 - tetrahydro - 2,4-pyrimidinedione, 0.54 part of sodium methoxide and 40 parts of methanol is stirred at room temperature, under nitrogen, for about 30 minutes. Crystallization of the product is induced by scratching on the walls of the container, and the resulting crystalline mixture is stored at room temperature for about 2 hours, then is filtered. The filter cake is washed with cold methanol and dried at approximately 70° to afford pure 1-allyl-3,6-diethyl-7-amino-1,2,3,4,5,6-hexahydro-2,4-pteridinedione as a light yellow solid, melting at about 163–165°. It is represented by the following structural formula

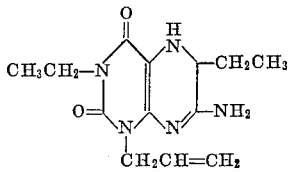

EXAMPLE 11

A mixture of 2.05 parts of 1-allyl-3-ethyl-5-(1-cyanobutylamino)-6-amino-1,2,3,4-tetrahydro-2,4 - pyrimidinedione, 0.19 part of sodium methoxide and 22.4 parts of methanol is stirred at room temperature, under nitrogen, for about 30 minutes, during which time complete solution occurs. Dilution of the mixture with approximately 28 parts of water results in precipitation of the crystalline product. The mixture is allowed to stand for approximately 2 hours, after which time the crystals are removed by filtration, washed on the filter with 1:1 aqueous methanol and dried in air. The resulting 1-allyl-3-ethyl-6-propyl-7-amino-1,2,3,4,5,6-hexahydro-2,4-pteridinedione obtained as an almost colorless solid melts at about 132–134° with effervescence and is represented by the following structural formula

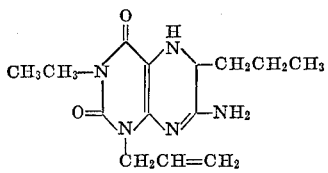

EXAMPLE 12

A mixture containing 2.77 parts of 1-methallyl-3-methyl-5-(1-cyanopropylamino)-6-amino-1,2,3,4-tetrahydro - 2,4-pyrimidinedione, 0.27 part of sodium methoxide and 32 parts of methanol is stirred at room temperature, under nitrogen, for about 30 minutes, complete solution occurring almost immediately. Dilution of the mixture with approximately 40 parts of water results in the gradual precipitation of a solid product. After standing for about 2 hours longer, that mixture is filtered and the resulting solid is washed first with 1:1 aqueous methanol, then with hexane and finally dried at approximately 70°. There is thus obtained, as a bright yellow solid, 1-methallyl-3-methyl-6-ethyl-7-amino-1,2,3,4,5,6-hexahydro - 2,4 - pteridinedione, which melts at about 211–214° and is represented by the following structural formula

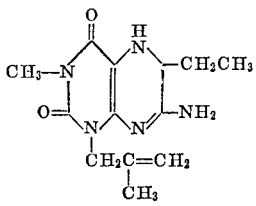

EXAMPLE 13

A mixture of 6.5 parts of 1-methallyl-3-methyl-5-(1-cyanobutylamino)-6-amino-1,2,3,4 - tetrahydro - 2,4 - pyrimidinedione, 0.6 part of sodium methoxide and 70.4 parts of methanol is stirred at room temperature, under nitrogen, for about 30 minutes, complete solution occurring almost immediately. Dilution of the mixture with approximately 88 parts of water results in separation of the solid product. The mixture is then allowed to stand at room temperature for approximately 2 hours longer, following which time the solid product is isolated by filtration, washed on the filter first with 1:1 aqueous methanol then with hexane and dried in air. 1-methallyl-3-methyl - 6 - propyl - 7 - amino - 1,2,3,4,5,6 - hexahydro-2,4-pteridinedione is thus obtained as a bright yellow solid, melting at about 190–195° and further characterized by the following structural formula

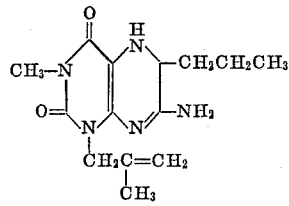

EXAMPLE 14

A mixture containing 5 parts of 1-allyl-3-ethyl-5-cyanomethylamino - 6 - amino - 1,2,3,4 - tetrahydro - 2,4 - pyrimidinedione, 1.08 part of sodium methoxide and 64 parts methanol is stirred at room temperature for about 1 hour. During that reaction time, complete solution first occurs followed by separation of a yellow solid. To the resulting suspension there is then added 0.05 part of ferrous chloride followed by 7.5 parts of 10% aqueous hydrogen peroxide over a period of about 5 minutes, during which time the temperature is maintained at approximately 30° by external cooling. The initial yellow solid gradually changes to a fluffy tan colored material. After stirring at room temperature for approximately 1 hour longer, the reaction mixture is diluted with approximately 80 parts of water, then is allowed to stand at room temperature for 1 hour and finally filtered. The solid product thus obtained is washed with water and dried, then recrystallized from ethanol to afford pure 1-allyl-3-ethyl-7-amino-1,2,3,4 - tetrahydro - 2,4 - pteridinedione as an almost colorless solid melting at about 279–281° and represented by the following structural formula

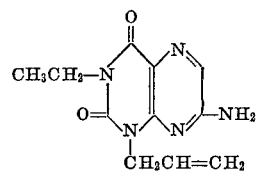

EXAMPLE 15

A mixture of 4.65 parts of 1-allyl-3-ethyl-5-(1-cyanopropylamino) - 6 - amino - 1,2,3,4 - tetrahydro - 2,4 - pyrimidinedione, 0.46 part of sodium methoxide and 53.6 parts of methanol is stirred at room temperature for about 30 minutes, during which time the mixture becomes homogeneous. To that solution is then successively added 0.036 part of ferrous chloride and, over a period of about 5 minutes, 6.75 parts of 10% aqueous hydrogen peroxide, during which time the reaction temperature is maintained at about 30° by means of external cooling. At the end of the latter addition, a solid product has separated. The mixture is then diluted with approximately 67 parts of water and stirred for about 30 minutes longer. Removal of the solid product by filtration followed by washing with water and drying in air results in the crude product, which is purified by recrystallization from ethanol to yield pure 1 - allyl - 3,6 - diethyl - 7 - amino - 1,2,3,4 - tetrahydro-2,4-pteridinedione as a colorless solid, which exhibits a melting point at about 222–224° and is represented by the following structural formula

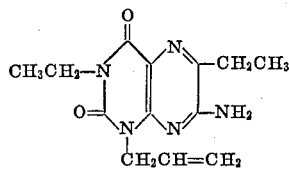

EXAMPLE 16

A mixture containing 4.08 parts of 1-allyl-3-ethyl-5-(1-cyanobutylamino) - 6 - amino - 1,2,3,4-tetrahydro-2,4-pyrimidinedione, 0.38 part of sodium methoxide and 44.8 parts of methanol is stirred at room temperature for about 30 minutes, during which time the reaction mixture becomes homogeneous. To the resulting solution is then added successively 0.03 part of ferrous chloride and, over a period of about 5 minutes, 5.4 parts of 10% aqueous hydrogen peroxide, the temperature being maintained at approximately 30° by means of external cooling. At the end of that time a heavy precipitate has formed. The reaction mixture is then diluted with approximately 56 parts of water and stirred for an additional 30 minutes. The solid crude product is collected by filtration, washed with water, dried in air, then recrystallized from ethanol to yield pure 1 - allyl-3-ethyl-6-propyl-7-amino-1,2,3,4-tetrahydro-2,4-pteridinedione, obtained as a colorless solid melting at about 231–233° and represented by the following structural formula

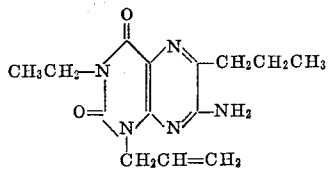

EXAMPLE 17

A mixture containing 2 parts of 1-allyl-3-ethyl-5-(1-cyanophenethylamino)-6-amino-1,2,3,4-tetrahydro-2,4 - pyrimidinedione, 0.16 part of sodium methoxide and 19.2 parts of methanol is stirred at room temperature for about 30 minutes, during which time homogeneity is achieved. To that solution is then added successively 0.013 part of ferrous chloride and, over a period of about 5 minutes, 2.25 parts of 10% aqueous hydrogen peroxide, the temperature being maintained at about 30° by means of external cooling. That mixture is then diluted with approximately 24 parts of water and stirred for an additional 30 minutes at room temperature. The solid crude product which has separated is isolated by filtration, washed with water, dried in air, then recrystallized from ethanol to afford 1-allyl-3-ethyl-6-benzyl-7-amino-1,2,3,4-tetrahydro-2,4-pteridinedione as a colorless solid melting at about 226–228° and represented by the following structural formula

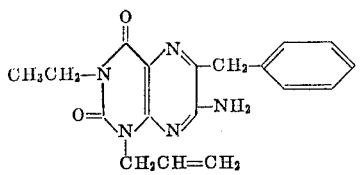

EXAMPLE 18

A mixture containing 2 parts of 1-allyl-3-ethyl-5-(1-cyanophenethylamino)-6-amino-1,2,3,4 - tetrahydro - 2,4-pyrimidinedione, 0.16 part of sodium methoxide and 19.2 parts of methanol is stirred at room temperature for about 30 minutes, during which time complete solution occurs. Dilution of that reaction mixture with water results in precipitation of the solid product which is isolated by filtration and dried to yield 1-allyl-3-ethyl-6-benzyl-7-amino-1,2,3,4,5,6-hexahydro-2,4-pteridinedione.

EXAMPLE 19

The substitution of an equivalent quantity of 1-methallyl-3-methyl-5-(1-cyano-3-phenylpropylamino)-6 - amino-1,2,3,4-tetrahydro-2,4-pyrimidinedione in the procedure of Example 18 results in 1-methallyl-3-methyl-6-phenethyl-7-amino-1,2,3,4,5,6-hexahydro-2,4-pteridinedione.

EXAMPLE 20

When an equivalent quantity of 1-methallyl-3-methyl-5-(1-cyano-3-phenylpropylamino)-6-amino-1,2,3,4 - tetrahydro-2,4-pyrimidinedione is substituted in the procedure of Example 17, there is obtained 1-methallyl-3-methyl-6-phenethyl-7-amino-1,2,3,4 - tetrahydro - 2,4 - pteridinedione.

EXAMPLE 21

A mixture containing 5.9 parts of 1-methallyl-3-methyl-5-(1-cyanopropylamino)-6-amino - 1,2,3,4 - tetrahydro-2,4-pyrimidinedione, 0.58 part of sodium methoxide and 68 parts of methanol is stirred at room temperature for about 30 minutes, during which time complete solution occurs. To that solution is then added successively 0.045 part of ferrous chloride and, over a period of about 5 minutes, 8.25 parts of 10% aqueous hydrogen peroxide, the temperature being maintained at about 30° by means of external cooling. During that time a heavy precipitate forms. The mixture is then diluted with approximately 80 parts of water, and stirring is continued at room temperature for about 30 minutes. The resulting solid is isolated by filtration, washed with water, dried, then recrystallized from ethanol to yield 1-methallyl-3-methyl-6-ethyl-7-amino-1,2,3,4-tetrahydro-2,4-pteridinedione as a colorless solid, melting at about 260–262°.

EXAMPLE 22

A mixture containing 6.41 parts of 1-methallyl-3-methyl-5-(1-cyanobutylamino)-6-amino - 1,2,3,4 - tetrahydro-2,4-pyrimidinedione, 0.6 part of sodium methoxide and 72 parts of methanol is stirred at room temperature for about 30 minutes, during which time homogeneity results. To that solution is then added successively 0.047 part of ferrous chloride and, over a period of about 5 minutes, 8.25 parts of 10% aqueous hydrogen peroxide, the temperature being maintained at approximately 30° by means of external cooling. During that time a heavy precipitate forms. The mixture is then diluted with approximately 90 parts of water and stirring is continued at room temperature for about 30 minutes longer. The resulting solid product is isolated by filtration, washed with water, dried and recrystallized from ethanol, thus affording pure 1-methallyl-3-methyl-6-propyl-7 - amino - 1,2,3,4 - tetrahydro-2,4-pteridinedione as colorless needle-like crystals, melting at about 218–220°. This compound is represented by the following structural formula

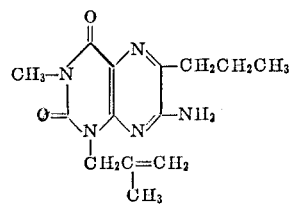

What is claimed is:
1. A compound of the formula

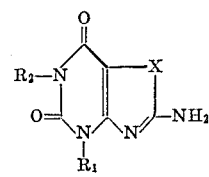

wherein $R_1$ is a lower alkenyl radical, $R_2$ is a lower alkyl radical and X is a radical completing the pyrazine ring structure and selected from the group consisting of

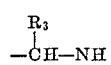

and

radicals, $R_3$ being hydrogen or a (lower alkylene)-Z radical, wherein Z is hydrogen or phenyl.

2. As in claim 1, a compound of the formula

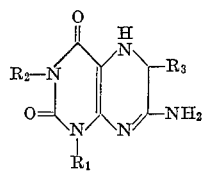

wherein $R_1$ is a lower alkenyl radical, $R_2$ is a lower alkyl radical and $R_3$ is hydrogen or a (lower alkylene)-Z radical, wherein Z is hydrogen or phenyl.

3. As in claim 1, a compound of the formula

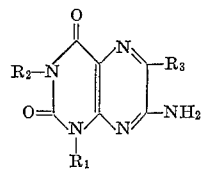

wherein $R_1$ is a lower alkenyl radical, $R_2$ is a lower alkyl radical and $R_3$ is hydrogen or a (lower alkylene)-Z radical, Z being hydrogen or phenyl.

4. As in claim 1, the compound which is 1-allyl-3-ethyl-7-amino-1,2,3,4,5,6-hexahydro-2,4-pteridinedione.

5. As in claim 1, the compound which is 1-allyl-3,6-diethyl-7-amino-1,2,3,4,5,6-hexahydro-2,4-pteridinedione.

6. As in claim 1, the compound which is 1-allyl-3-ethyl-6-propyl-7-amino-1,2,3,4,5,6 - hexahydro-2,4-pteridinedione.

7. As in claim 1, the compound which is 1-methallyl-3 - methyl - 6 - ethyl-7-amino-1,2,3,4,5,6-hexahydro-2,4-pteridinedione.

8. As in claim 1, the compound which is 1-methallyl-3-methyl - 6 - propyl - 7-amino-1,2,3,4,5,6-hexahydro-2,4-pteridinedione.

9. As in claim 1, the compound which is 1-allyl-3-ethyl-7-amino-1,2,3,4-tetrahydro-2,4-pteridinedione.

10. As in claim 1, the compound which is 1-allyl-3,6-diethyl-7-amino-1,2,3,4-tetrahydro-2,4-pteridinedione.

11. As in claim 1, the compound which is 1-allyl-3-ethyl - 6-propyl-7-amino-1,2,3,4-tetrahydro-2,4-pteridinedione.

12. As in claim 1, the compound which is 1-allyl-3-ethyl - 6-benzyl-7-amino-1,2,3,4-tetrahydro-2,4-pteridinedione.

13. As in claim 1, the compound which is 1-methallyl-3 - methyl - 6-ethyl-7-amino-1,2,3,4-tetrahydro-2,4-pteridinedione.

14. As in claim 1, the compound which is 1-methallyl-3 - methyl-6-propyl-7-amino-1,2,3,4-tetrahydro-2,4-pteridinedione.

References Cited

UNITED STATES PATENTS 3,162,635  12/1964  Schroeder _____ 260—251.5

OTHER REFERENCES

Blicke et al.: J. Am. Chem. Soc. 76, 2798–2800 (1954).

ALEX MAZEL, Primary Examiner

R. V. RUSH, Assistant Examiner

U.S. Cl. X.R.

260—251, 999